(12) United States Patent
Albanesi

(10) Patent No.: US 7,743,604 B1
(45) Date of Patent: Jun. 29, 2010

(54) APPARATUS FOR HEATING THE DUMP BODY OF A DUMP TRUCK HAVING A DIESEL PARTICULATE FILTER

(76) Inventor: Daniel Albanesi, P.O. Bpx 293, Columbus, NJ (US) 08022

( * ) Notice: Subject to any disclaimer, the term of this patent is extended or adjusted under 35 U.S.C. 154(b) by 444 days.

(21) Appl. No.: 11/690,512

(22) Filed: Mar. 23, 2007

(51) Int. Cl.
*F01N 3/00* (2006.01)

(52) U.S. Cl. .............................. 60/287; 60/272; 60/288; 60/292; 60/309; 60/311; 60/324; 298/1 H (58) Field of Classification Search .................. 60/272, 60/286, 287, 288, 291, 292, 309, 311, 323, 60/324; 298/1 H
See application file for complete search history.

(56) References Cited

U.S. PATENT DOCUMENTS

| | | | |
|---|---|---|---|
| 2,974,997 A | | 3/1961 | Parsley et al. |
| 3,134,628 A | * | 5/1964 | Lackey et al. ............. 298/21 R |
| 3,664,706 A | * | 5/1972 | Chant .......................... 298/1 H |
| 3,695,708 A | | 10/1972 | Vincenty |
| 3,994,530 A | * | 11/1976 | Zaborsky et al. ............ 298/1 H |
| 4,002,370 A | * | 1/1977 | Blackmore .................. 298/1 H |
| 5,379,801 A | | 1/1995 | Reinhart et al. |
| 5,384,098 A | | 1/1995 | Morikawa |
| 5,622,311 A | * | 4/1997 | Huston et al. ............ 237/12.3 C |
| 5,797,656 A | * | 8/1998 | Kauk et al. .................. 298/1 H |
| 6,113,193 A | | 9/2000 | Kunzeman |
| 6,851,256 B2 | | 2/2005 | Chamoto et al. |
| 6,871,489 B2 | | 3/2005 | Tumati et al. |
| 6,874,488 B2 | | 4/2005 | Ieda |
| 7,100,993 B2 | | 9/2006 | Fanelli |
| 7,253,641 B2 | * | 8/2007 | Knitt et al. .................. 324/639 |
| 7,320,504 B2 | * | 1/2008 | Colling ....................... 298/1 H |
| 2004/0231323 A1 | | 11/2004 | Fujita et al. |
| 2006/0096280 A1 | | 5/2006 | Zhan et al. |

OTHER PUBLICATIONS http://www.mctrucks.com/news_and_events.asp; news from the Jul. 2006 portion of the web site. Downloaded Jan. 23, 2007.

* cited by examiner

*Primary Examiner*—Binh Q Tran
(74) *Attorney, Agent, or Firm*—Gerry J. Elman; Elman Technology Law, P.C.

(57) ABSTRACT

A system for providing heat to the dump body of a dump truck is disclosed. The disclosed system is suitable for use with truck equipped with a diesel particulate filter. When enabled, the system controls the exit path of exhaust gas such that it is routed to the dump body during normal operating conditions. In one embodiment, when the diesel particulate filter enters a regeneration cycle, high heat is produced. The system then routes the exhaust gas as to bypass the dump body to avoid heat damage from the higher temperature exhaust gas.

18 Claims, 8 Drawing Sheets

APPARATUS FOR HEATING THE DUMP BODY OF A DUMP TRUCK HAVING A DIESEL PARTICULATE FILTER

FIELD OF THE INVENTION

The present invention relates generally to improved apparatus for selectively diverting a flow of exhaust to the dump body of the truck to provide heat to a dump truck body.

BACKGROUND

A dump truck includes a dump body (or bed) for receiving material therein. Typically, the body can be raised by a hydraulic system so as eject the material from the bed at an appropriate time. Thereafter, the body can be lowered so that additional material may be loaded therein.

During certain weather conditions, the material in the body has a tendency to adhere to the contact surfaces of the body (e.g. during cold weather conditions) thereby resisting ejection of the material from the bed. To overcome this problem, it is known to provide a duct system within the body for receiving a flow of exhaust generated by the truck engine so that the flow of exhaust may be passed through the body, thereby heating the contact surfaces. Examples of such heated-body systems are disclosed in U.S. Pat. No. 2,974,997 by Parsely et al, and U.S. Pat. No. 5,797,656 by Kauk et al, the disclosures of both of which are incorporated herein by reference, to the extent not inconsistent herewith. By providing heat to the body in the aforesaid manner, the tendency of the material to adhere to the contact surfaces of the body during freezing weather is reduced.

Recently, stricter environmental regulations have been passed. The new regulations will require enhanced filtering of particulates via a Diesel Particulate Filter (DPF). The DPF traps particulates with a filter. When the filter becomes full, an additional burner activates to burn off the particulates at a higher temperature than that of the exhaust under normal operating conditions.

When the DPF activates (known as the "regeneration" cycle, or "regen" for short), then the exhaust gas increases from the normal 500-900 degrees Fahrenheit to as high as 1100 degrees Fahrenheit. This temperature can weaken or damage an aluminum dump body. It can also damage the paint on a steel dump body.

Attempts to address this problem have included a plastic liner to line the dump body. In practice, this has limited effectiveness, since material may undesirably adhere to the plastic liner under certain conditions. An alternative attempt to address this issue includes a separate fuel-powered heater to heat the dump body. This has the disadvantage of extra weight and complexity for an additional heat-generating system, as well requiring additional fuel for supplying the additional heat-generating system. Therefore, what is needed is the ability to heat the dump body of a truck having a diesel particulate filter, without the aforementioned disadvantages.

SUMMARY OF THE INVENTION

The present invention provides a system for providing heat to the dump body of a dump truck. The system of the present invention is suitable for use with truck equipped with a diesel particulate filter. When enabled, the system controls the exit path of exhaust gas such that it is routed to the body dump body during normal operating conditions. In one embodiment, when the diesel particulate filter enters a regeneration cycle, high heat is produced. The system then routes the exhaust gas as to bypass the dump body to avoid heat damage from the higher temperature exhaust gas. In another embodiment, the system partially diverts the exhaust gas, such that a portion of the exhaust gas enters the dump body during the regeneration cycle of the diesel particulate filter, providing heat to the dump body during the regeneration cycle, yet restricting the flow of exhaust gas, thereby preventing damage to the dump body.

The present invention further provides a system for providing heat to the dump body of a dump truck using exhaust, comprising a diesel engine, an exhaust stack having a venting end, and a diesel particulate filter, the exhaust gas of said diesel engine routed to the input of the diesel particulate filter, the exhaust output from the diesel particulate filter routed to an exhaust temperature control module, the exhaust temperature control module having temperature sensing means, and exhaust diverting means, whereby the exhaust gas is diverted to the dump body when the exhaust gas is at or below a predetermined threshold, and the exhaust gas bypasses the dump body when the exhaust gas exceeds a predetermined threshold.

The present invention further provides an exhaust diverting means that comprises:

an air cylinder, said air cylinder connected to an extension member;
an air supply conduit connected to the air cylinder;
an air flow controller disposed inline with said air supply conduit;
a temperature sensor, the temperature sensor disposed to provide a temperature signal to the air flow controller;
a diverter control arm having a first and second end;
the first end of the diverter control arm connected to the extension member; and
the second end of the diverter control arm connected to a diverter; whereby the temperature signal causes activation of the air cylinder, moving the extension member, thereby moving the diverter control arm, and establishing the position of the diverter.

The present invention further provides an operator control, whereby the operator control is disposed to disable and enable the air flow controller, thereby providing the truck operator with the capability to disable the system.

The present invention further provides an operator control comprising a temperature selection control, whereby a predetermined threshold temperature of the air flow controller is adjustable by the operator.

The present invention further provides an operator control comprising a temperature selection control having a lower selectable limit of about 650 degrees Fahrenheit, and an upper selectable limit of about 800 degrees Fahrenheit.

The present invention further provides a system comprising:

a second air flow controller disposed inline with said air supply conduit; and
a second temperature sensor, the temperature sensor disposed to provide a temperature signal to the second air flow controller. This provides an additional margin of safety.

The present invention further provides a system comprising an exhaust diverting means comprising:

an electrically actuated magnetic control cylinder, the cylinder connected to an extension member;
an electric supply conduit connected to the cylinder;
a switch disposed inline with the electric supply conduit;
a temperature sensor, the temperature sensor disposed to provide a temperature signal to the switch;
a diverter control arm having a first and second end;

the first end of the diverter control arm connected to the extension member; and the second end of the diverter control arm connected to a diverter; whereby the temperature signal causes activation of the electrically actuated magnetic control cylinder, moving the extension member, thereby moving the diverter control arm, and establishing the position of the diverter.

The present invention further provides a system comprising an exhaust diverting means that comprises a heat sensitive coil spring actuator disposed to control the position of a diverter, whereby the heat sensitive coil spring actuator is configured to actuate at a predetermined temperature, thereby establishing the exit path of the exhaust gas.

The present invention further provides a system wherein the exhaust temperature control module is mounted to the venting end of the exhaust stack.

The present invention further provides a system for providing heat to the dump body of a dump truck using exhaust, comprising a diesel engine, an exhaust stack having a venting end, and a diesel particulate filter, the exhaust gas of the diesel engine routed to the input of the diesel particulate filter, the exhaust output from the diesel particulate filter routed to an exhaust temperature control module, the exhaust temperature control module having temperature sensing means, and exhaust diverting means, whereby the exhaust gas is diverted to the dump body when the exhaust gas is at or below a predetermined threshold, and the exhaust gas bypasses the dump body when the exhaust gas exceeds a predetermined threshold, wherein the exhaust diverting means comprises:

an air cylinder, the air cylinder connected to an extension member;

an air supply conduit connected to the air cylinder;

at least one air flow controller disposed inline with the air supply conduit;

at least one temperature sensor, each of the temperature sensors disposed to provide a temperature signal to a corresponding air flow controller;

a diverter control arm having a first and second end;

the first end of said diverter control arm connected to the extension member; and the second end of the diverter control arm connected to a diverter; whereby the temperature signals cause activation of the air cylinder, moving the extension member, thereby moving the diverter control arm, and establishing the position of the diverter. If any one of the temperature signals indicates that the temperature exceeds a predetermined threshold, then the air cylinder is deactivated, and exhaust gas bypasses the dump body. This provides an additional margin of safety.

DETAILED DESCRIPTION

Figure 1:
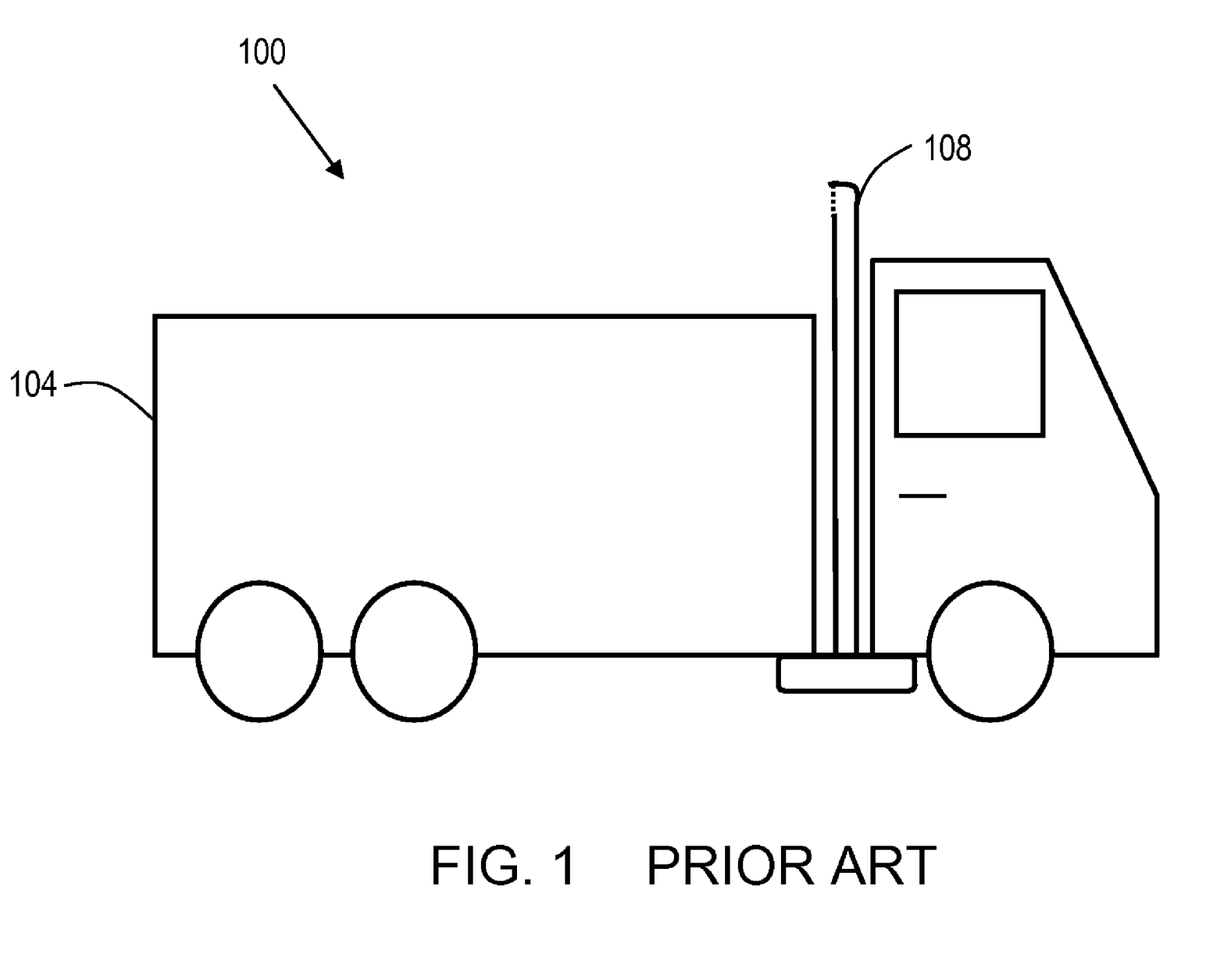
FIG. 1 shows a prior art dump truck, identifying the dump body and exhaust stack.

FIG. 1 shows a prior art dump truck 100, having a dump body 104, and an exhaust stack 108. In this prior art dump truck, exhaust gas will either exit via exhaust stack 108, or pass through the dump body 104, depending on whether the dump body is in a horizontal or tilted orientation. This system works satisfactorily when no DPF is present. However, with a DPF, the exhaust gas is too hot to safely enter the truck body 104 during the DPF regen cycle. The present invention addresses this problem.

Figure 2:
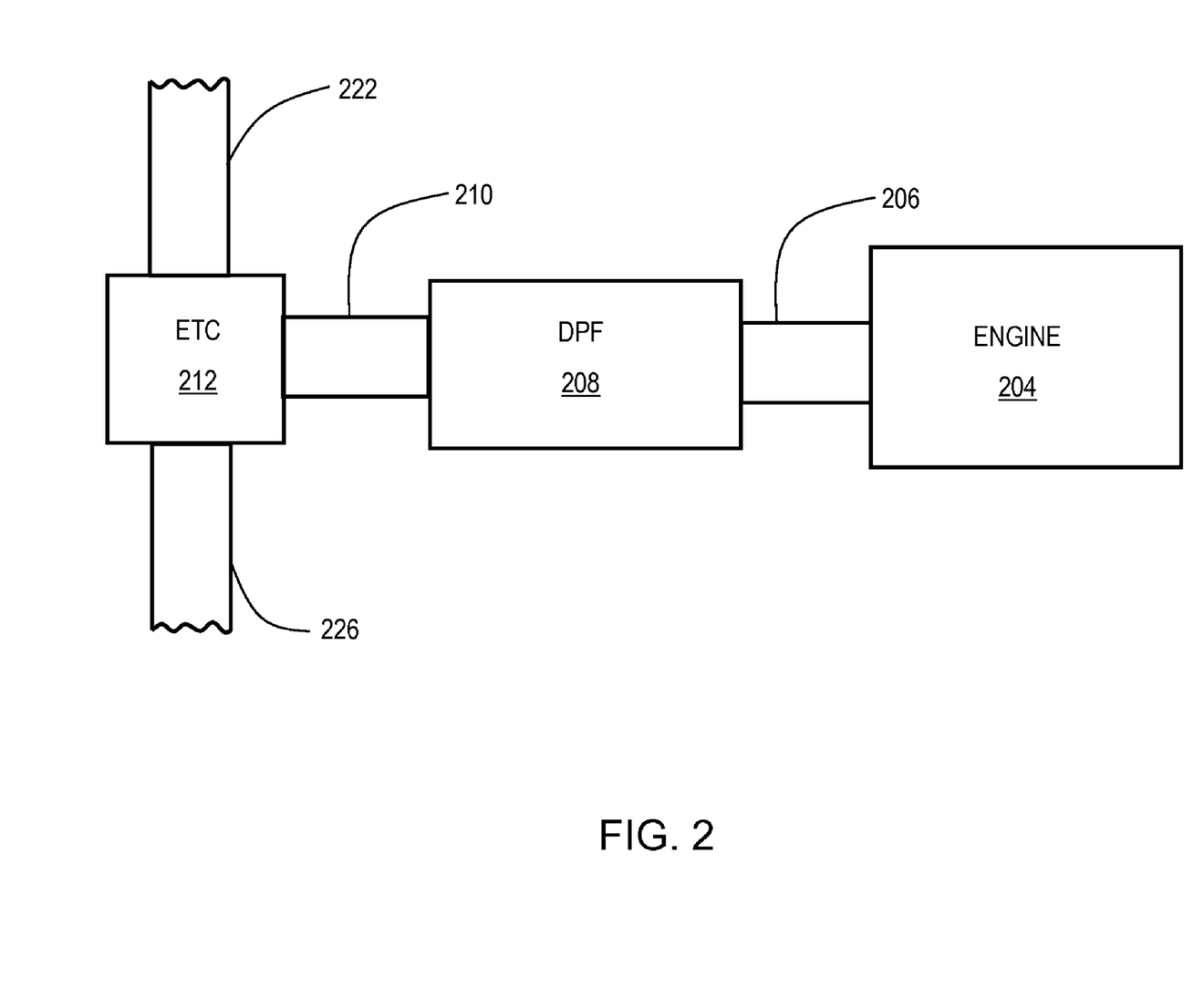
FIG. 2 shows a block diagram of an exhaust system that utilizes the present invention.

FIG. 2 shows a block diagram of an exhaust system 200 that utilizes the present invention. In this case, a diesel engine 204 outputs exhaust gas via conduit 206 to a DPF 208. The exhaust gas of the DPF 208 is output via conduit 210 to the exhaust temperature control module (ETC) 212 of the present invention. Exhaust gas is output from the ETC 212 via conduit 222, which leads to the exhaust stack of the dump truck (in which case the exhaust gas bypasses the dump body), or via conduit 226, which leads to the dump body of the dump truck. Hence, ETC 212 establishes the exit path of the exhaust gas. In some operating modes, the exhaust gas may be output via both conduit 222 and conduit 226 simultaneously, in varying amounts, to maintain a desired temperature range of exhaust gas output to conduit 226. Other elements that are not depicted in this block diagram, but may be present, include muffler devices, and other pollution control devices, such as catalytic converters, as is well known in the art.

Figure 3A:
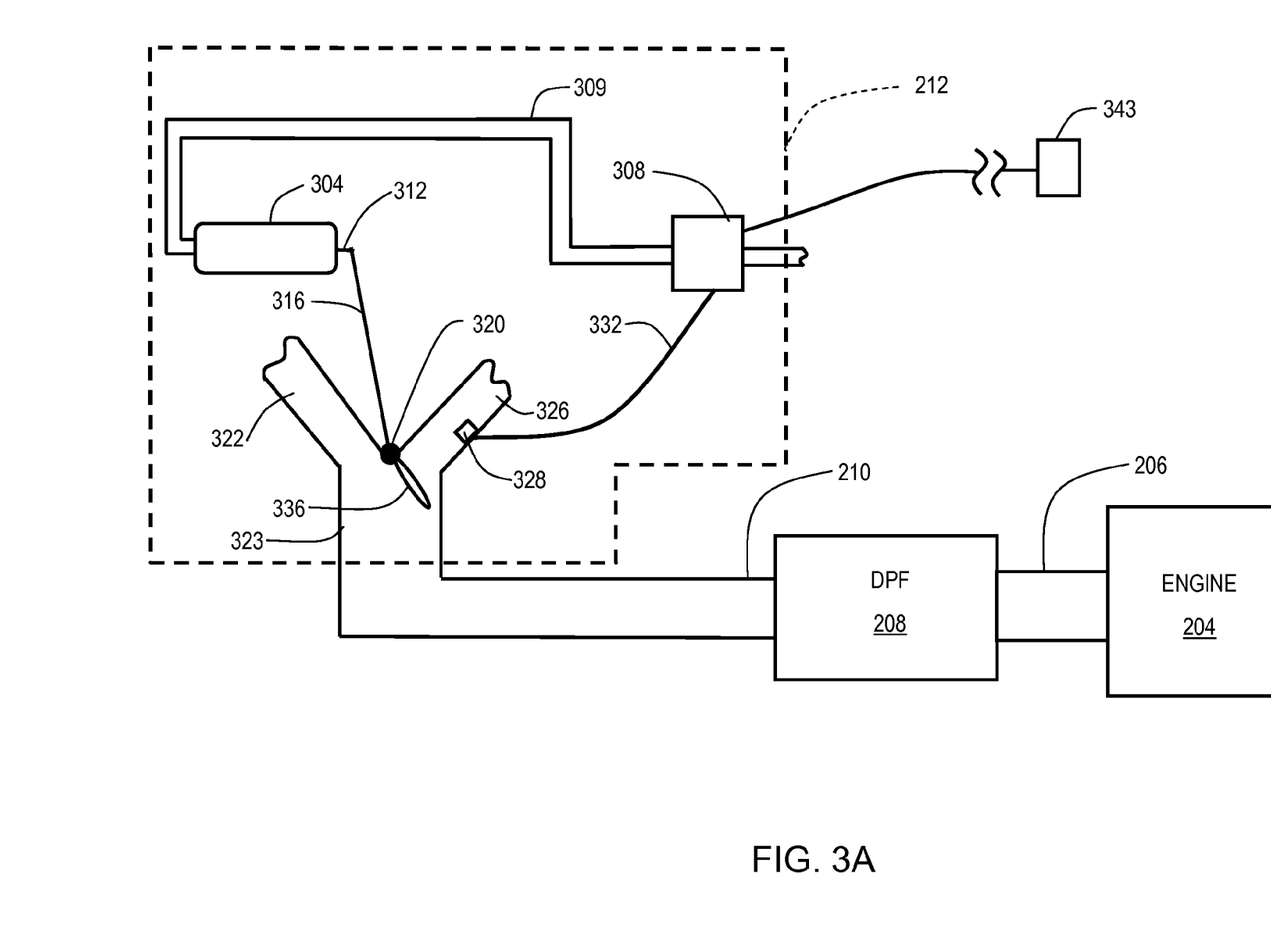
FIGS. 3A and 3B show additional details of an embodiment of the exhaust temperature control module of the present invention.

FIG. 3A shows additional detail of an embodiment of the exhaust temperature control module 212 of the present invention. In this embodiment, exhaust gas travels from the engine 204 via conduit 206, and enters DPF 208. The exhaust gas exits DPF 208 via conduit 210, and enters ETC module 212. Within ETC module 212, exhaust may be routed to conduit 322, which leads to the exhaust stack (e.g. 108 of FIG. 1), or routed to conduit 326, which leads to the dump body (e.g. 104 of FIG. 1) to provide heat to the dump body. An air cylinder 304 moves extension member 312 when supplied with air. Extension member 312 is connected to diverter control arm 316. Diverter control arm 316 is attached to pivot joint 320. Inside the exhaust pipe 323, diverter 336 is connected to diverter control arm 316. As shown in FIG. 3A, the air cylinder is biased such that when no compressed air source is fed into air cylinder 304, all exhaust gas is routed via conduit 322, and is sent to the exhaust stack. Compressed air is supplied to air cylinder 304 via air supply conduit 309. The flow of compressed air to air supply conduit 309 is controlled by air flow controller 308, which is disposed inline with air supply conduit 309. Air flow controller 308 provides compressed air to air cylinder 304 upon detecting a safe temperature from temperature sensor 328. Temperature sensor 328 provides a temperature signal via signal path 332. The temperature sensing means may be implemented by a variety of technologies, including, but not limited to, thermocouples, thermistors, RTD (resistance temperature detectors), and thermal imaging devices. In one embodiment of the present invention, the temperature signal provided by temperature sensor 328 is a binary signal that indicates if a predetermined temperature threshold is exceeded. In another embodiment of the present invention, the temperature signal is an analog signal whose voltage varies in a predetermined relationship to temperature. In yet another embodiment of the present invention, the temperature signal is a digital communication signal, providing temperature values in packets or a data stream that is received by air flow controller 308. Air flow controller may also be configured to restrict compressed air flow via operator control 343. Operator control 343 is preferably located within the cab of the truck. In this way, an operator can disable the dump body heat when the conditions do not require it. This may be the case when the ambient temperature is above freezing, when the dump body is raised, or when the dump body is empty. Operator control 343 may optionally provide a temperature selection control for adjustment of the predetermined threshold temperature for diverting the exhaust gas to the dump body. For example, the control may provide for adjusting the threshold temperature in a range from 650 degrees Fahrenheit to 800 degrees Fahrenheit.

Figure 3B:
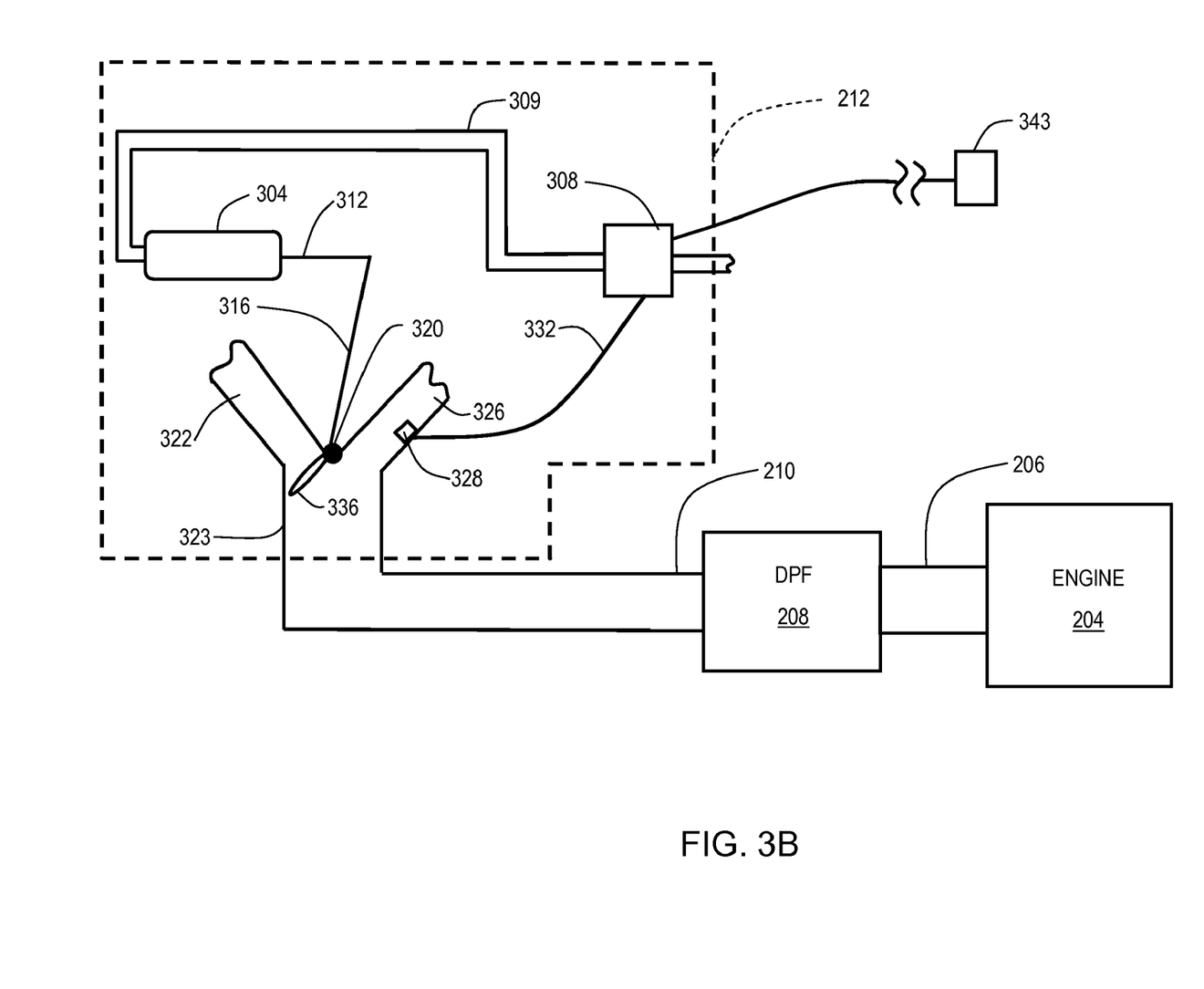

As shown in FIG. 3B, when air cylinder 304 is supplied with compressed air, it causes extension member 312 to extend. This causes diverter 336 to move to a position that directs the majority of the exhaust gas to conduit 326, which supplies the exhaust gas to the dump body, thereby providing heat to the dump body. When the DPF 208 initiates a regen cycle, the exhaust gas will rise from approximately 500-900 degrees Fahrenheit to approximately 1,100 degrees Fahrenheit. The air flow controller 308 is preferably configured to stop the flow of compressed air when the exhaust gas temperature at the temperature sensor 328 exceeds about 700 degrees Fahrenheit, thereby diverting exhaust gas via conduit 322 to the exhaust stack (as shown in FIG. 3A). This ensures that the dump body, which is usually aluminum or steel, is not subject to excessive heat.

In one embodiment, it is contemplated that the flow controller will either route exhaust gas to the exhaust stack (via conduit 322), or route exhaust gas to the dump body (via conduit 326). However, it is also contemplated that an embodiment may provide more precise temperature control via a variable positioning of the diverter 336, such that said portion of the exhaust gas is allowed to flow through conduit 322, and a portion is simultaneously allowed to flow through conduit 326, thereby allowing for more precise control of the exhaust gas entering the dump body.

Figure 3C:
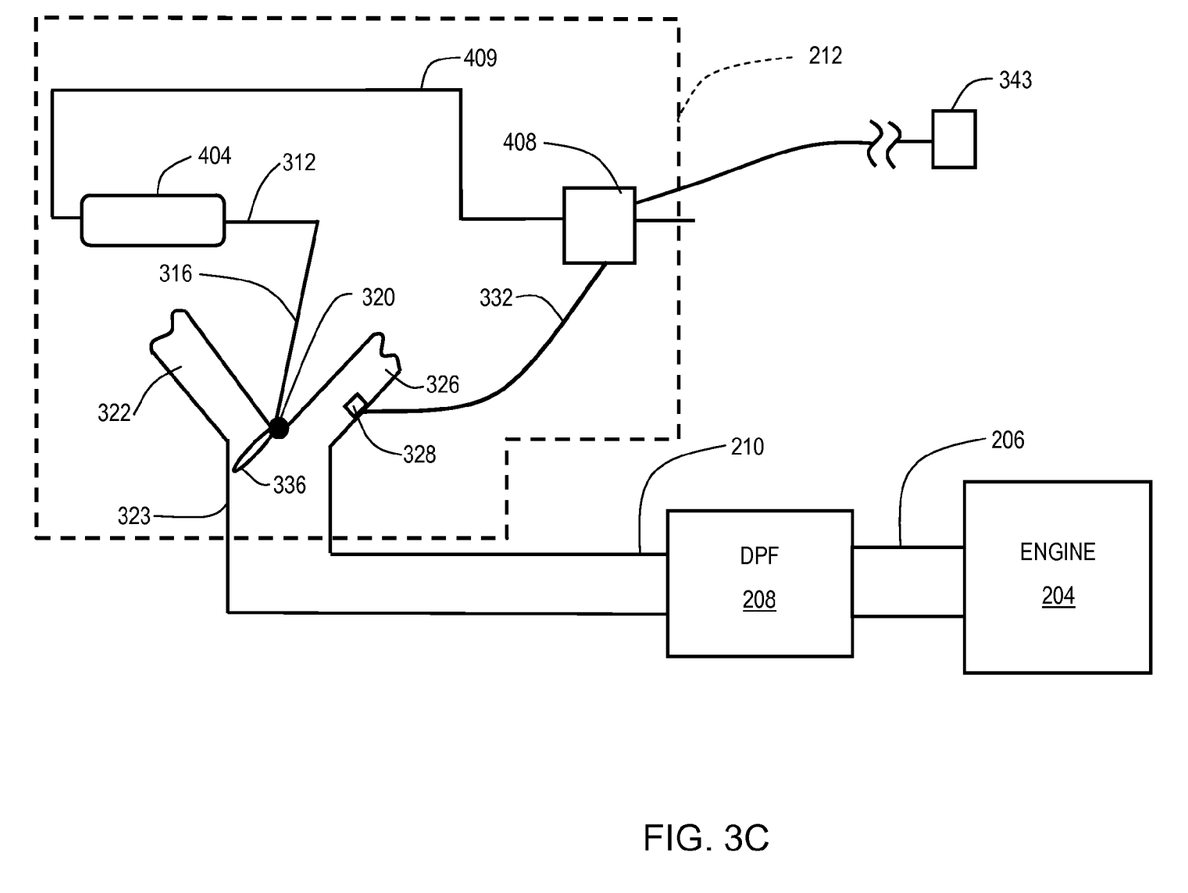
FIGS. 3C and 3D show additional details of alternative embodiments of the exhaust temperature control module of the present invention.

FIG. 3C shows an alternative embodiment of the exhaust temperature control module 212 of the present invention. In this embodiment, an electrically actuated magnetic control cylinder 404 is used in place of an air cylinder. In this embodiment, the electric supply to cylinder 404 is delivered via electric conduit 409, and is controlled by switch 408. Switch 408 provides electric current to cylinder 404 upon detecting a safe temperature from temperature sensor 328.

Figure 3D:
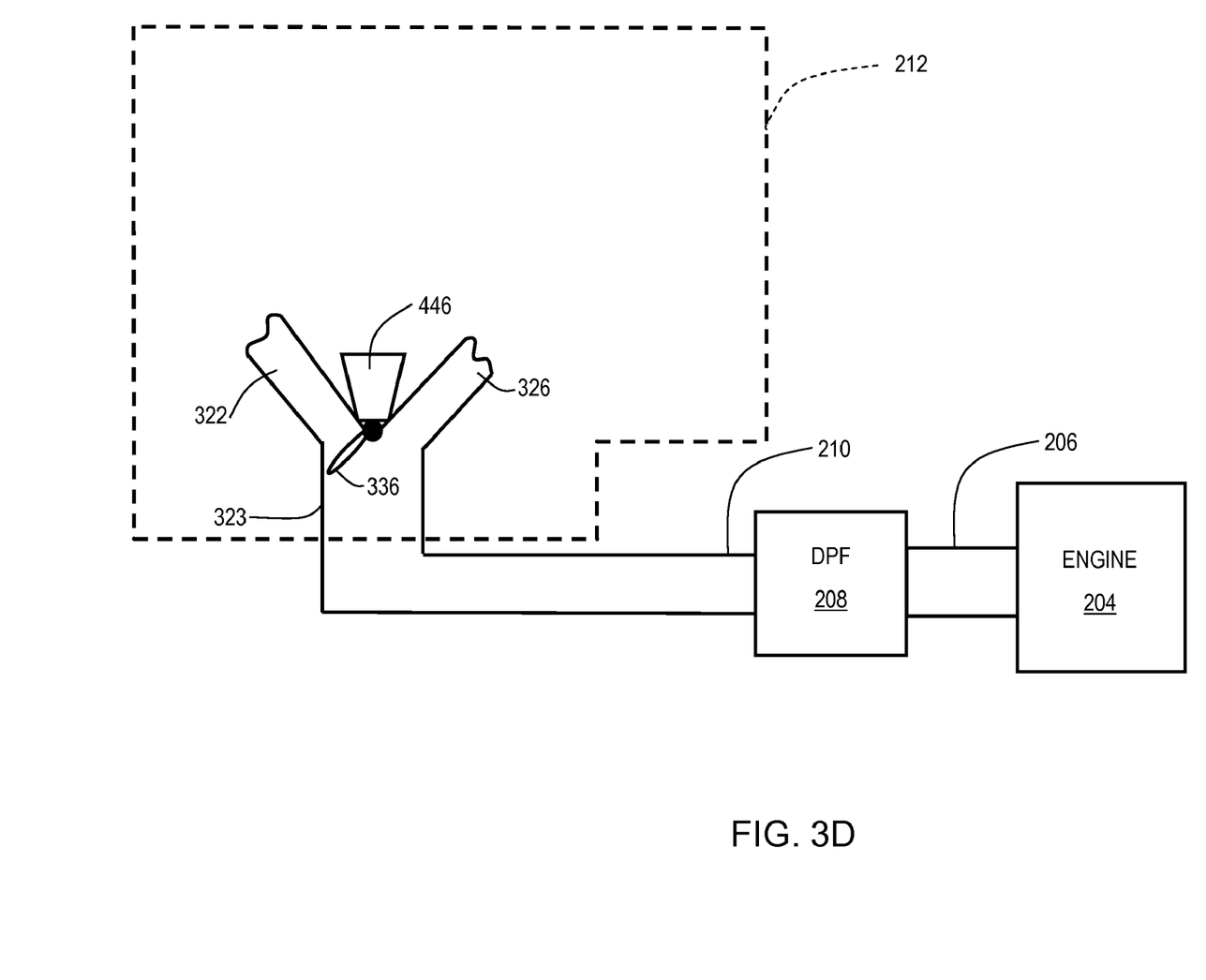

FIG. 3D shows an alternative embodiment of the exhaust temperature control module 212 of the present invention. In this embodiment, heat sensitive coil spring actuator 446 controls the diverter 336. When the temperature of actuator 446 exceeds a predetermined level, the diverter 336 moves to block conduit 326, and allows exhaust to vent to the exhaust stack via conduit 322.

Figure 4:
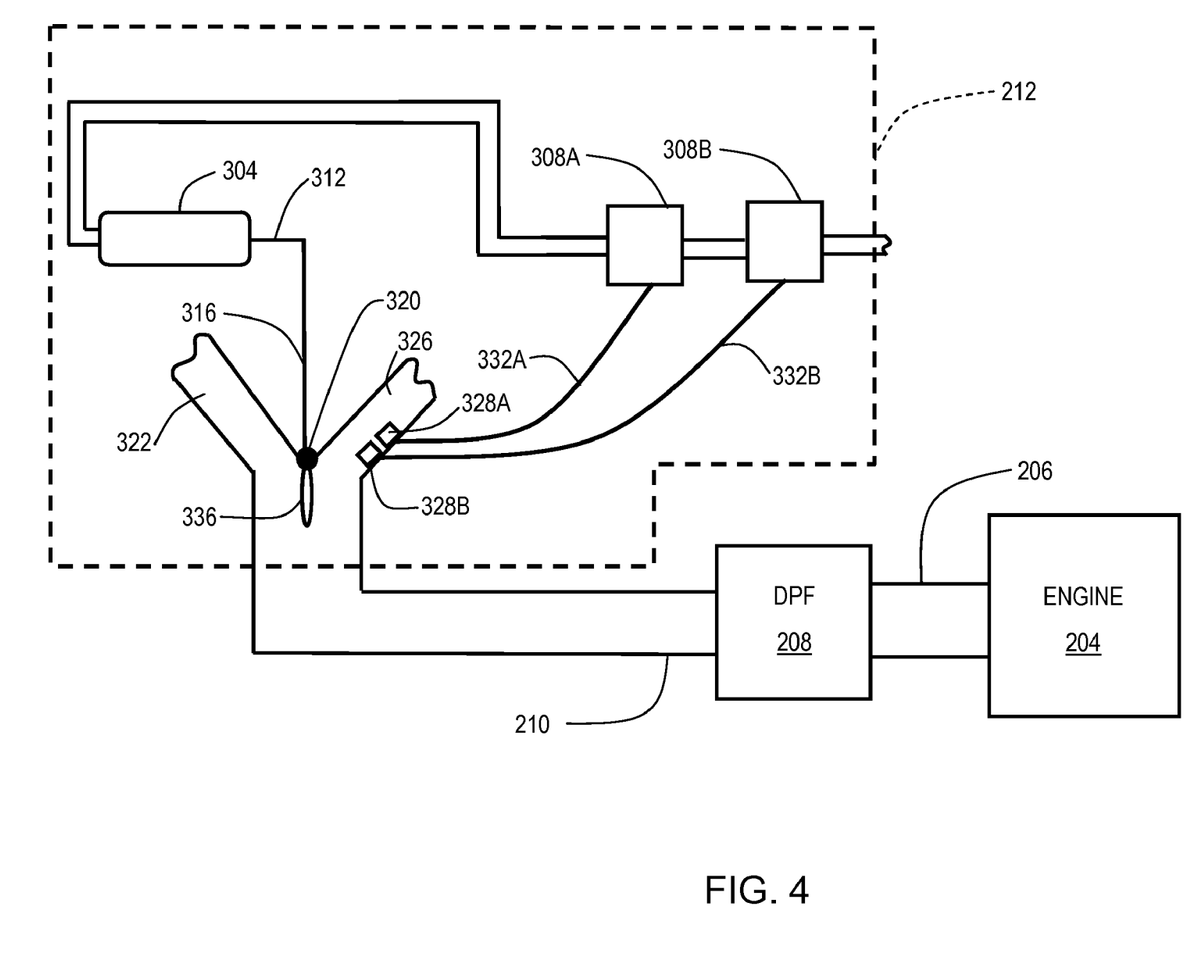
FIG. 4 shows another alternative embodiment of the exhaust temperature control module of the present invention.

FIG. 4 shows an alternative embodiment of the exhaust temperature control module 212 of the present invention. In this embodiment, two temperature sensors (328A, 328B) are used. Temperature sensor 328A provides a temperature signal via signal path 322A to air flow controller 308A. Temperature sensor 328B provides a temperature signal via signal path 332B to air flow controller 308B. In this arrangement, an extra margin of safety is provided by having air flow controllers 308A and 308B in series, each controlled with independent temperature sensors (328A and 328B) and signal paths (332A and 332B). If either one of the air flow controllers (308A, 308B) stops the flow of compressed air to air cylinders 304, the exhaust gas will be diverted to the exhaust stack via conduit 332. In this way, if one temperature sensor or signal path fails, the redundancy of multiple temperature sensors and signal paths allows for the exhaust gas to be diverted via conduit 332 to the exhaust stack, thereby preventing excessively hot exhaust gas from entering the dump body.

Figure 5:
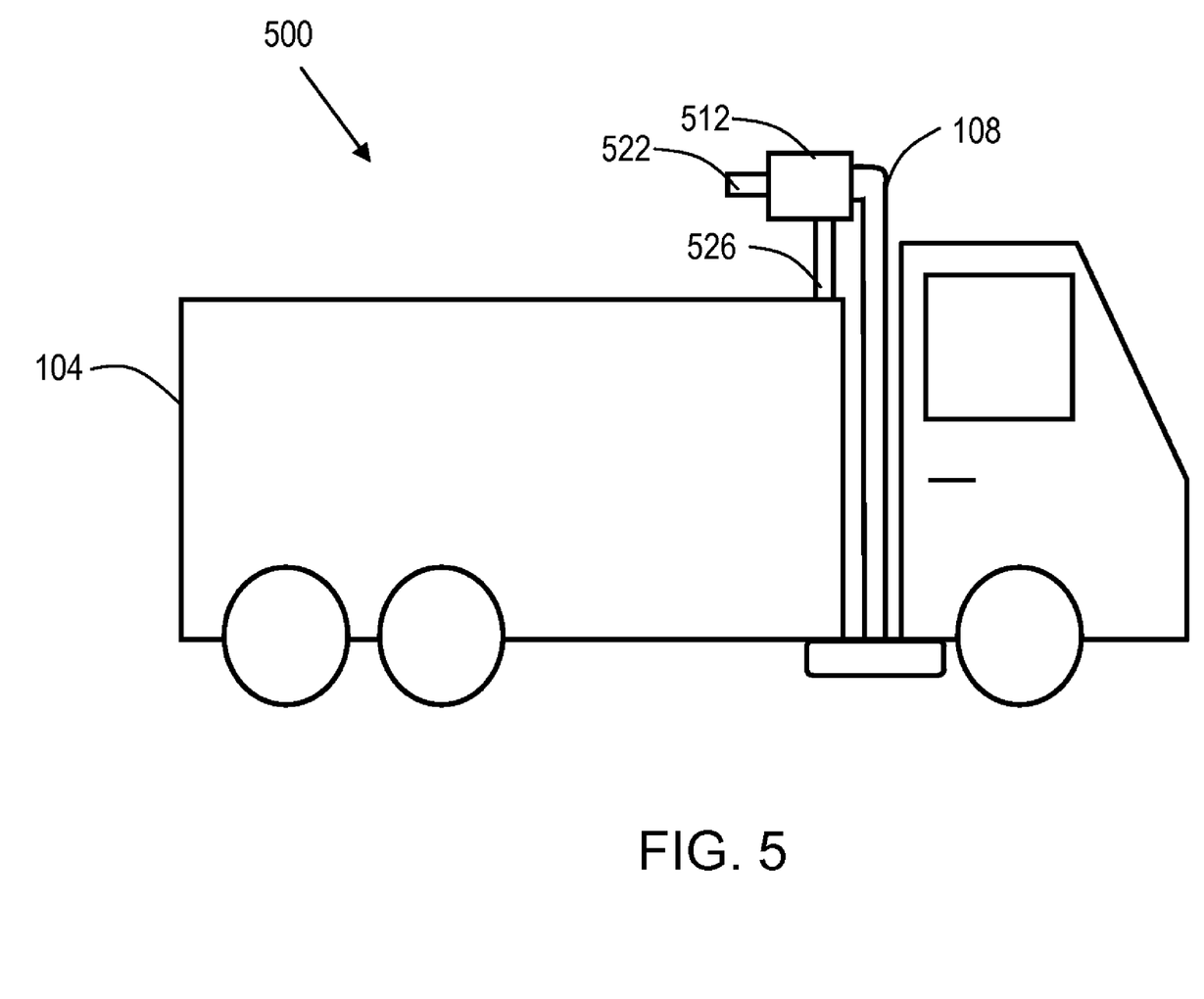
FIG. 5 shows a dump truck equipped with the exhaust temperature control module of the present invention.

FIG. 5 shows a dump truck 500 equipped with the exhaust temperature control module 512 of the present invention, and a DPF (not shown). In this embodiment, an exhaust temperature control module (ETC) 512 (similar to the ETC 212 described previously) is adapted to mount to the venting end of exhaust stack 108. Electrical and compressed air supplies (not shown) are also provided to ETC 512. When the ETC is operating in a mode to provide heat to the dump body 104, it routes exhaust gas via conduit 526. When the ETC is operating in a mode to prevent exhaust gas from entering the dump body 104, it routes exhaust gas to the atmosphere via conduit 522. In this way, the present invention can be adapted to a dump truck with no modification to the exhaust system prior to the point where the exhaust would be output to the atmosphere.

Although the descriptions above contain many specific details, these should not be construed as limiting the scope of the invention, but merely as providing illustrations of some of the presently preferred embodiments of this invention. For example, exhaust gas diverting mechanisms may be used, such as an electrically actuated magnetic control cylinder, or a heat sensitive coil spring actuating the diverter. Various types of signaling arrangements can be used in addition to, or instead of monitoring the temperature, such as monitoring a DPF activation signal directly from the DPF device or the engine. Thus the scope of the invention should be determined by the appended claims and their legal equivalents, rather than by the examples given.

What is claimed is:

1. A system for providing heat to a dump body of a dump truck using exhaust, comprising a diesel engine, an exhaust stack having a venting end, a diesel particulate filter having an input and an output for exhaust gas, exhaust gas from said diesel engine being routed to the input of the diesel particulate filter, and, an exhaust temperature control module, the exhaust gas output from said diesel particulate filter being routed to said exhaust temperature control module, said exhaust temperature control module comprising: i) temperature sensing means, said temperature sensing means including a first temperature sensor, and, ii) exhaust-diverting means, said exhaust-diverting means including a movable diverter member; wherein said exhaust temperature control module controls: i) said diverter member for movement to a position where exhaust gas is diverted to the dump body when the exhaust gas temperature is sensed by said temperature sensing means to be at or below a predetermined threshold temperature, and, ii) said diverter member for movement to a position where the exhaust gas bypasses the dump body when the exhaust gas temperature sensed by said temperature sensing means exceeds the predetermined threshold temperature.

2. The system of claim 1, wherein the exhaust-diverting means additionally comprises:
   an extension member;
   an air cylinder, said air cylinder being connected to said extension member;
   an air supply conduit connected to said air cylinder;
   an air flow controller disposed inline with said air supply conduit;
   said first temperature sensor providing a temperature signal to said air flow controller;
   said diverter member including a control arm connected to said extension member; and
   wherein said temperature signal causes activation of said air cylinder, moving the extension member, thereby moving said control arm and establishing the position of said diverter member.

3. The system of claim 2, further comprising an operator control adapted to disable and enable said air flow controller, thereby providing an operator with the capability to disable said system.

4. The system of claim 3, wherein said operator control further comprises a temperature selection control wherein said predetermined threshold temperature is adjustable by the operator.

5. The system of claim 4, wherein said temperature selection control has a lower selectable limit of about 650 degrees Fahrenheit, and an upper selectable limit of about 800 degrees Fahrenheit.

6. The system of claim 2, further comprising:
a second air flow controller disposed inline with said air supply conduit; and
a second temperature sensor, said second temperature sensor being configured to provide a temperature signal to said second air flow controller.

7. The system of claim 1, wherein the exhaust-diverting means additionally comprises:
an extension member;
an electrically actuated magnetic control cylinder connected to said extension member;
an electric supply conduit connected to said cylinder;
a switch disposed inline with said electric supply conduit;
said first temperature sensor configured for providing a binary temperature signal to said switch;
said diverter member including a control arm connected to said extension member; and
wherein receipt of said binary temperature signal causes said switch to activate said electrically actuated magnetic control cylinder, moving said extension member, thereby moving said control arm, and establishing the position of said diverter member.

8. The system of claim 1, wherein said exhaust-diverting means additionally comprises a heat-sensitive coil spring actuator disposed to control the position of said diverter member and configured to actuate at said predetermined threshold temperature, thereby establishing the position of said diverter member.

9. The system of claim 1, wherein the exhaust-temperature control module is mounted to the venting end of the exhaust stack.

10. The system of claim 9, wherein the exhaust-diverting means comprises:
an extension member;
an air cylinder, said air cylinder connected to said extension member;
an air supply conduit connected to said air cylinder;
an air flow controller disposed inline with said air supply conduit;
said first temperature sensor configured to provide a temperature signal to said air-flow controller;
said diverter member including a control arm being connected to said extension member; and
wherein said temperature signal causes activation of said air cylinder when said temperature signal is received by said air-flow controller, causing said air-flow controller to provide air to said air cylinder, thereby moving said extension member, thereby moving said control arm, and establishing the position of said diverter member.

11. The system of claim 10, further comprising an operator control, whereby said operator control is disposed to disable and enable said air flow controller, thereby providing an operator with the capability to disable said system.

12. The system of claim 11, wherein said operator control further comprises a temperature selection control, whereby said predetermined threshold temperature is adjustable by an operator.

13. The system of claim 12, wherein said temperature selection control has a lower selectable limit of about 650 degrees Fahrenheit, and an upper selectable limit of about 800 degrees Fahrenheit.

14. The system of claim 10, further comprising:
a second air flow controller disposed inline with said air supply conduit; and
a second temperature sensor, said second temperature sensor configured to provide a temperature signal to said second air flow controller.

15. The system of claim 9, wherein the exhaust-diverting means additionally comprises:
an extension member;
an electrically actuated magnetic control cylinder connected to said extension member;
an electric supply conduit connected to said magnetic control cylinder;
a switch disposed inline with said electric supply conduit;
said first temperature sensor to output a temperature signal to said switch;
said diverter member including a control arm being connected to said extension member; and
wherein said temperature signal causes activation of said electrically actuated magnetic control cylinder, moving said extension member, thereby moving said control arm and establishing the position of said diverter member.

16. The system of claim 9, wherein said exhaust-diverting means comprises a heat sensitive coil spring actuator disposed to control the position of said diverter member, wherein said heat sensitive coil spring actuator is configured to actuate at said predetermined threshold temperature, thereby establishing the position of said diverter member.

17. The system of claim 15, further comprising an operator control, wherein said operator control is configured to disable and enable electric current in said electric supply conduit to said magnetic control cylinder, thereby providing an operator with the capability to disable said system.

18. A system for providing heat to the dump body of a dump truck using exhaust, comprising a diesel engine, an exhaust stack having a venting end, and a diesel particulate filter, the exhaust gas of said diesel engine routed to the input of the diesel particulate filter, the exhaust output from said diesel particulate filter routed to an exhaust temperature control module, said exhaust temperature control module having temperature sensing means, and exhaust diverting means, whereby the exhaust gas is diverted to the dump body when the exhaust gas is at or below a predetermined threshold, and the exhaust gas bypasses the dump body when the exhaust gas exceeds a predetermined threshold, wherein the exhaust-diverting means comprises:
a diverter;
an extension member;
an air cylinder connected to the extension member;
an air supply conduit connected to said air cylinder;
at least one air flow controller disposed inline with said air supply conduit;
at least one temperature sensor, each said temperature sensor being configured to provide a temperature signal to one of said at least one air flow controllers;
a diverter control arm having a first and second end;
the first end of said diverter control arm being connected to said extension member; and
the second end of said diverter control arm being connected to the diverter; whereby said temperature signal causes activation of the air cylinder, moving the extension member, thereby moving the diverter control arm and establishing the position of the diverter.

* * * * *